US011648741B2

(12) United States Patent  
McIver et al.

(10) Patent No.: US 11,648,741 B2  
(45) Date of Patent: May 16, 2023

(54) METHODS OF EMBEDDING AN ELONGATE SUSCEPTOR WITHIN A THERMOPLASTIC BODY

(71) Applicant: The Boeing Company, Chicago, IL (US)

(72) Inventors: Carl Roy McIver, Everett, WA (US); Landon Keith Henson, Snoqualmie, WA (US); John R. Hull, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 137 days.

(21) Appl. No.: 16/878,333

(22) Filed: May 19, 2020

(65) Prior Publication Data

US 2021/0362438 A1 Nov. 25, 2021

(51) Int. Cl.  
*B29C 70/82* (2006.01)  
*B29C 65/44* (2006.01)  
(Continued)

(52) U.S. Cl.  
CPC .............. *B29C 70/82* (2013.01); *B29C 65/44* (2013.01); *H05B 6/105* (2013.01); *B29C 70/70* (2013.01);  
(Continued)

(58) Field of Classification Search  
CPC .............................. B29C 70/82; B29C 70/885  
See application file for complete search history.

(56) References Cited

U.S. PATENT DOCUMENTS 2,539,690 A * 1/1951 Boorn .................... B32B 27/00  
156/298  
3,750,441 A * 8/1973 Schneider ................ B30B 1/00  
72/56  
(Continued)

FOREIGN PATENT DOCUMENTS

DE  102006001777  7/2007  
EP  0128837  12/1984  
FR  2742691  6/1997

OTHER PUBLICATIONS

European Patent Office, Extended European Search Report for related European Patent Application No. 21156427, dated Aug. 2, 2021.  
(Continued)

*Primary Examiner* — Benjamin A Schiffman  
(74) *Attorney, Agent, or Firm* — Kolitch Romano Dascenzo Gates LLC (57) ABSTRACT

Methods of embedding an elongate susceptor within a thermoplastic body and systems that perform the methods are disclosed herein. The methods include extending the elongate susceptor such that an extended portion of the elongate susceptor extends between a guide structure and a body-contacting structure. The methods also include heating a segment of the elongate susceptor to produce a heated portion of the elongate susceptor. The methods further include pressing a leading region of the heated portion of the elongate susceptor through a body surface of the thermoplastic body and into the thermoplastic body. The methods also include operatively translating at least one of the guide structure, the body-contacting structure, and an application tool that includes the guide structure and the body-contacting structure along an embedment pathway for the elongate susceptor.

20 Claims, 7 Drawing Sheets

(51) Int. Cl.
  *H05B 6/10* (2006.01)
  *B29K 701/12* (2006.01)
  *B29K 705/00* (2006.01)
  *B29L 7/00* (2006.01)
  *B29L 31/30* (2006.01)
  *B29C 43/18* (2006.01)
  *B29C 70/70* (2006.01)

(52) U.S. Cl.
  CPC .... *B29C 2043/182* (2013.01); *B29K 2701/12* (2013.01); *B29K 2705/00* (2013.01); *B29L 2007/002* (2013.01); *B29L 2031/3076* (2013.01)

(56) References Cited

U.S. PATENT DOCUMENTS

| | | | | |
|---|---|---|---|---|
| 3,954,547 | A * | 5/1976 | Genthner | H05B 3/86 156/178 |
| 4,684,428 | A * | 8/1987 | Ewen | H05B 3/26 219/535 |
| 4,824,497 | A * | 4/1989 | Tilman | A44B 19/40 428/179 |
| 4,865,674 | A | 9/1989 | Durkin | |
| 4,929,408 | A * | 5/1990 | Lodder | B29C 53/30 425/114 |
| 4,956,138 | A * | 9/1990 | Barfield | B29C 70/82 264/249 |
| 4,978,825 | A | 12/1990 | Schmidt et al. | |
| 5,259,051 | A * | 11/1993 | Burack | B29C 66/4722 385/91 |
| 5,282,301 | A * | 2/1994 | Roentgen | B29C 70/82 29/33 F |
| 5,470,419 | A * | 11/1995 | Sasaki | B65D 75/5844 493/212 |
| 5,708,251 | A * | 1/1998 | Naveh | B29D 23/005 219/121.85 |
| 5,756,973 | A | 5/1998 | Kirkwood et al. | |
| 5,792,298 | A * | 8/1998 | Sauer | B32B 17/10376 156/230 |
| 5,863,635 | A | 1/1999 | Childress | |
| 5,868,886 | A | 2/1999 | Alston et al. | |
| 6,436,507 | B1 | 8/2002 | Pannell | |
| 6,881,291 | B2 * | 4/2005 | Platz | B29C 66/69 29/850 |
| 7,069,637 | B2 * | 7/2006 | Jones | B29C 70/82 29/561 |
| 7,410,267 | B2 * | 8/2008 | Mochizuki | F21V 29/90 219/202 |
| 8,236,220 | B2 * | 8/2012 | Monk | B29C 70/82 264/271.1 |
| 8,323,444 | B2 * | 12/2012 | Grgac | B29C 70/82 156/359 |
| 8,741,091 | B2 | 6/2014 | Hardy | |
| 9,314,965 | B2 * | 4/2016 | Jones | B29D 23/005 |
| 9,336,588 | B2 | 5/2016 | Crothers et al. | |
| 9,604,403 | B1 | 3/2017 | Wilenski et al. | |
| 10,059,089 | B2 | 8/2018 | Jurgens et al. | |
| 10,160,172 | B2 | 12/2018 | Huang et al. | |
| 10,338,413 | B2 * | 7/2019 | Mazzucco | G02C 5/008 |
| 11,317,515 | B2 * | 4/2022 | Espalin | B33Y 10/00 |
| 2007/0102486 | A1* | 5/2007 | Cote | H01L 24/35 228/101 |
| 2008/0128078 | A1 | 6/2008 | May et al. | |
| 2013/0149501 | A1 | 6/2013 | Pacchione et al. | |
| 2014/0268604 | A1 | 9/2014 | Wicker et al. | |
| 2020/0114615 | A1 | 4/2020 | Crothers | |
| 2021/0187878 | A1* | 6/2021 | Marcoe | B29C 70/32 |

OTHER PUBLICATIONS

English language translation of the abstract of DE 102006001777, downloaded from Espacenet.com Nov. 1, 2021.

* cited by examiner

METHODS OF EMBEDDING AN ELONGATE SUSCEPTOR WITHIN A THERMOPLASTIC BODY

FIELD

The present disclosure relates generally to methods of embedding an elongate susceptor within a thermoplastic body and/or to systems that perform the methods.

BACKGROUND

Thermoplastic patch panels may be bonded to a base structure, such as an aircraft, to assemble the base structure and/or to repair a damaged region of the base structure. Thermoplastic patch panels often include a thermoplastic body and a plurality of lengths of an elongate susceptor embedded within the thermoplastic body. The plurality of lengths of elongate susceptor may be inductively heated to at least partially soften and/or melt the thermoplastic body, which then may be applied to the base structure. Upon cooling, the thermoplastic body bonds to the base structure, thereby effecting the assembly and/or repair.

In certain applications, it may be desirable to utilize relatively thin thermoplastic patch panels. In some such examples, a thickness of the thermoplastic body may be similar to, or only slightly larger than, a characteristic transverse cross-sectional dimension, such as a diameter, of the plurality of lengths of elongate susceptor. In some such examples, the thermoplastic body may include a significant amount of latent stress and/or may deform when heated.

In the above examples, conventional methodologies for generating the thermoplastic patch panel may be ineffective, may cause the thermoplastic body to unacceptably deform, and/or may damage the thermoplastic body. Thus, there exists a need for improved methods of embedding an elongate susceptor within a thermoplastic body and/or for systems that perform the methods.

SUMMARY

Methods of embedding an elongate susceptor within a thermoplastic body and systems that perform the methods are disclosed herein. The methods include extending the elongate susceptor from a guide structure of an application tool to a body-contacting structure of the application tool and such that an extended portion of the elongate susceptor extends between the guide structure and the body-contacting structure. The methods also include heating a segment of the elongate susceptor to produce a heated portion of the elongate susceptor. The heating includes heating with a heating structure of the application tool and to a segment temperature that is greater than a melt temperature of the thermoplastic body. The methods further include pressing a leading region of the heated portion of the elongate susceptor through a body surface of the thermoplastic body and into the thermoplastic body. The pressing includes pressing with the body-contacting structure. The methods also include operatively translating at least one of the body-contacting structure and the application tool along an embedment pathway for the elongate susceptor that is defined along the body surface. The operatively translating is concurrent with the pressing and the extending and includes smoothing the body surface with the body-contacting structure.

The systems include an application tool, a translation structure, and a controller. The application tool includes a guide structure, which is configured to guide the elongate susceptor, a body-contacting structure, which is configured to contact a body surface of the thermoplastic body, and a heating structure, which is configured to heat a segment of the elongate susceptor. The translation structure is configured to operatively translate the application tool and the thermoplastic body relative to one another along an embedment pathway for the elongate susceptor. The controller is programmed to control the operation of the application tool and the translation structure according to the methods.

DESCRIPTION

FIGS. 1-8 provide illustrative, non-exclusive examples of base structures 80, of thermoplastic repair systems 68, of systems 10 for embedding a length of an elongate susceptor within a thermoplastic body, and/or of methods 200, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 1:
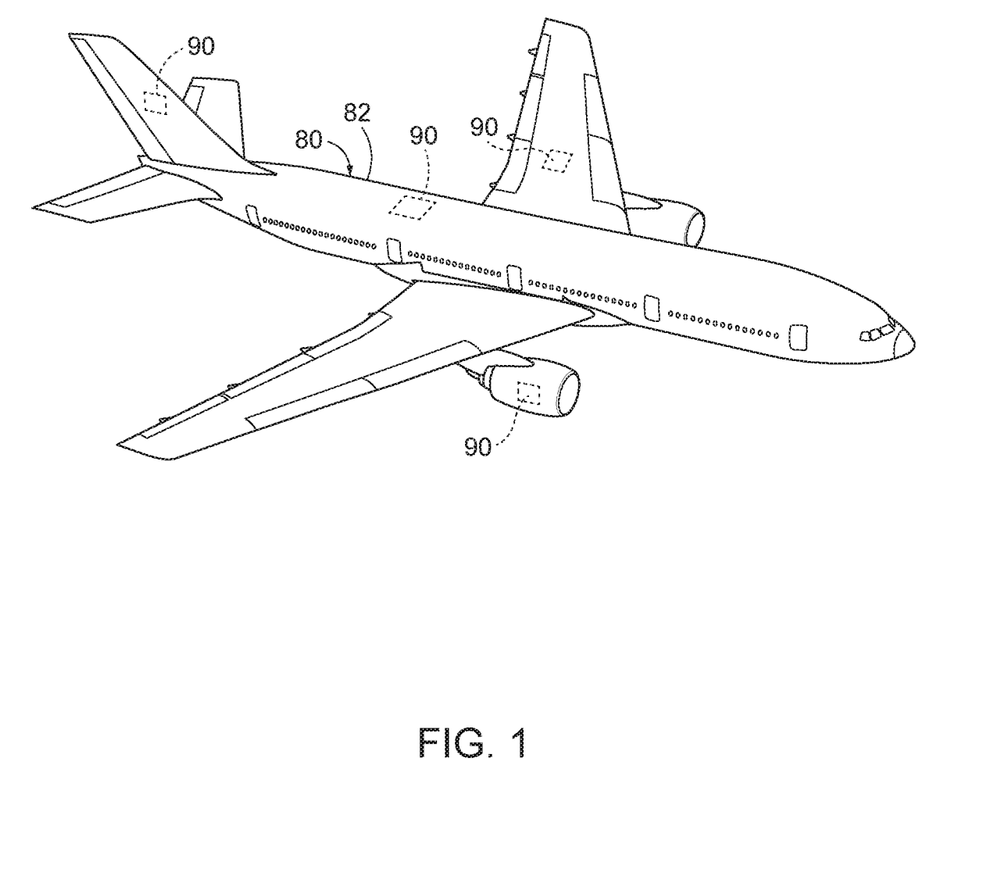
FIG. 1 is a schematic illustration of an example of a base structure in the form of an aircraft that may be utilized with thermoplastic patch panels, according to the present disclosure.

FIG. 1 is a schematic illustration of an example of a base structure 80 in the form of an aircraft 82 that may be utilized with thermoplastic patch panels 90, according to the present disclosure. As illustrated in FIG. 1, aircraft 82 may include one or more thermoplastic patch panels 90, and thermoplastic patch panels 90 may be attached to, bonded to, and/or associated with any suitable component and/or structure of aircraft 82. In specific examples, one or more thermoplastic patch panels 90 may be attached to, bonded to, and/or associated with a fuselage of the aircraft, a wing of the aircraft, an engine of the aircraft, a stabilizer of the aircraft, and/or a tail of the aircraft.

Figure 2:
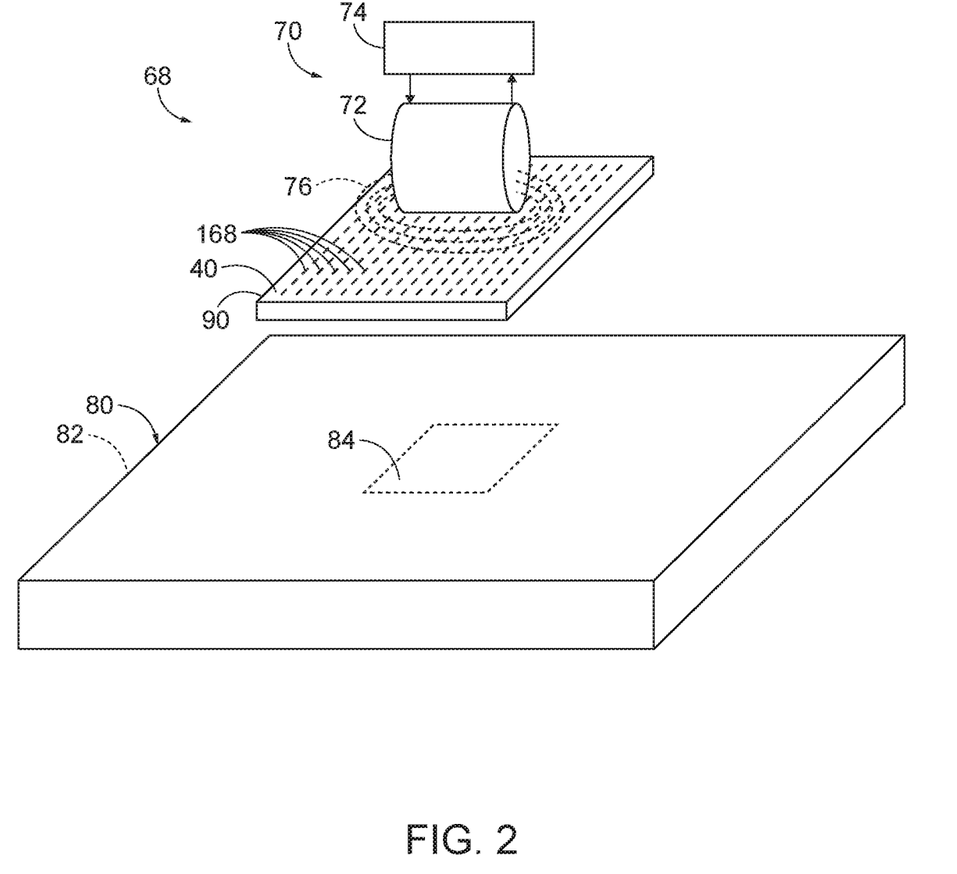
FIG. 2 is a schematic illustration of examples of a thermoplastic repair system that may be utilized with thermoplastic patch panels, according to the present disclosure.
Figure 3:
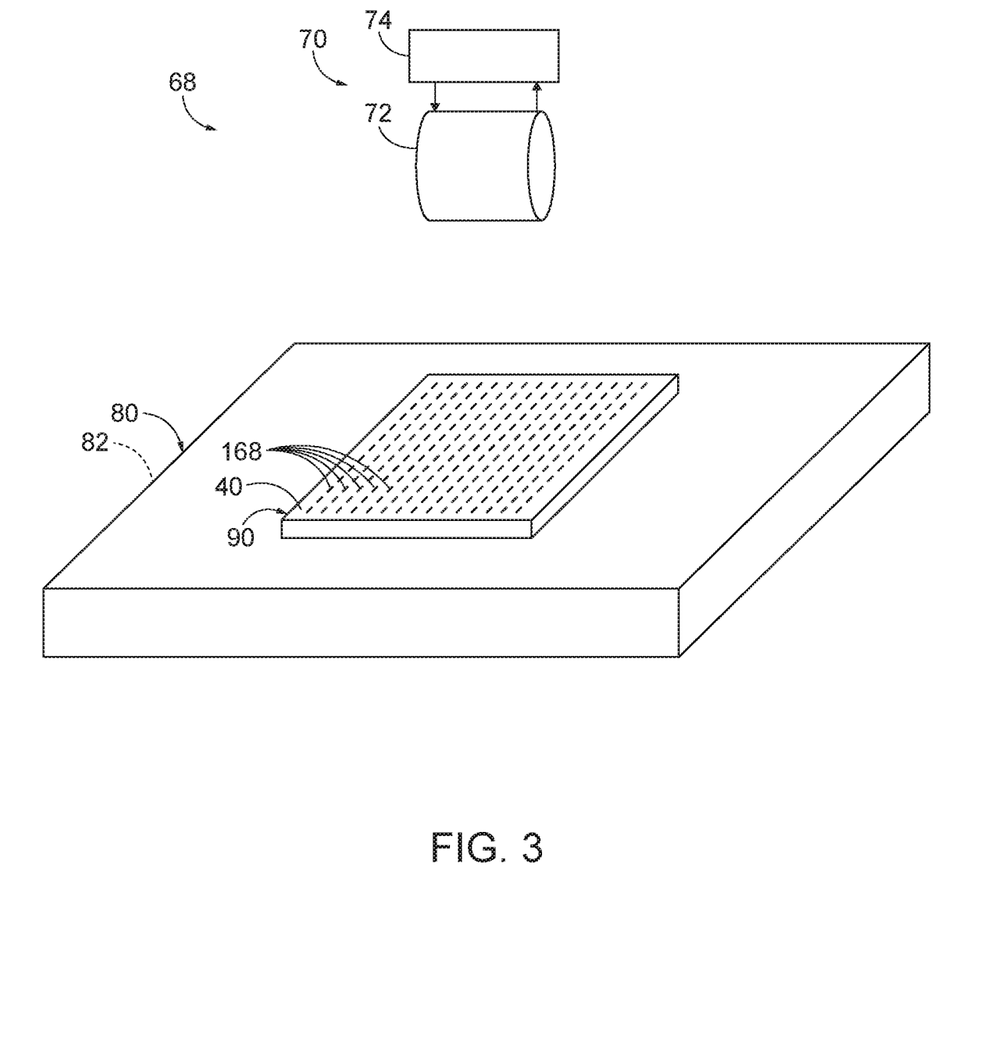
FIG. 3 is another schematic illustration of the thermoplastic repair system of FIG. 2.

FIGS. 2-3 are schematic illustrations of examples of a thermoplastic repair system 68 that may be utilized with thermoplastic patch panels 90 that may be formed utilizing the systems and/or methods, according to the present disclosure. As illustrated in FIGS. 2-3, thermoplastic repair system 68 includes an inductive heating assembly 70, which may be configured to inductively heat thermoplastic patch panel 90. In a specific example, inductive heating assembly 70 includes an electromagnet 72 and a power supply 74. Power supply 74 may be configured to provide an alternating current, or a high-frequency alternating current, to electromagnet 72. As illustrated in FIG. 2, and responsive to receipt of the alternating current, electromagnet 72 may produce and/or generate a magnetic field, or a high-frequency magnetic field, 76. Magnetic field 76 may induce electric currents within lengths 168 of elongate susceptor that are embedded within a thermoplastic body 40 of thermoplastic patch panel 90, thereby heating the thermoplastic patch panel.

Subsequently, and as illustrated by the transition from the configuration illustrated in FIG. 2 to the configuration illustrated in FIG. 3, thermoplastic patch panel 90 may be applied to, or brought into contact with, a base structure 80. Upon cooling, thermoplastic patch panel 90 may bond with and/or may adhere to base structure 80. In some examples, and as illustrated in dashed lines in FIG. 2, base structure 80 may include a damaged region 84. In some such examples, and as illustrated in FIG. 3, thermoplastic patch panel 90 may be utilized to cover and/or to repair damaged region 84.

Figure 4:
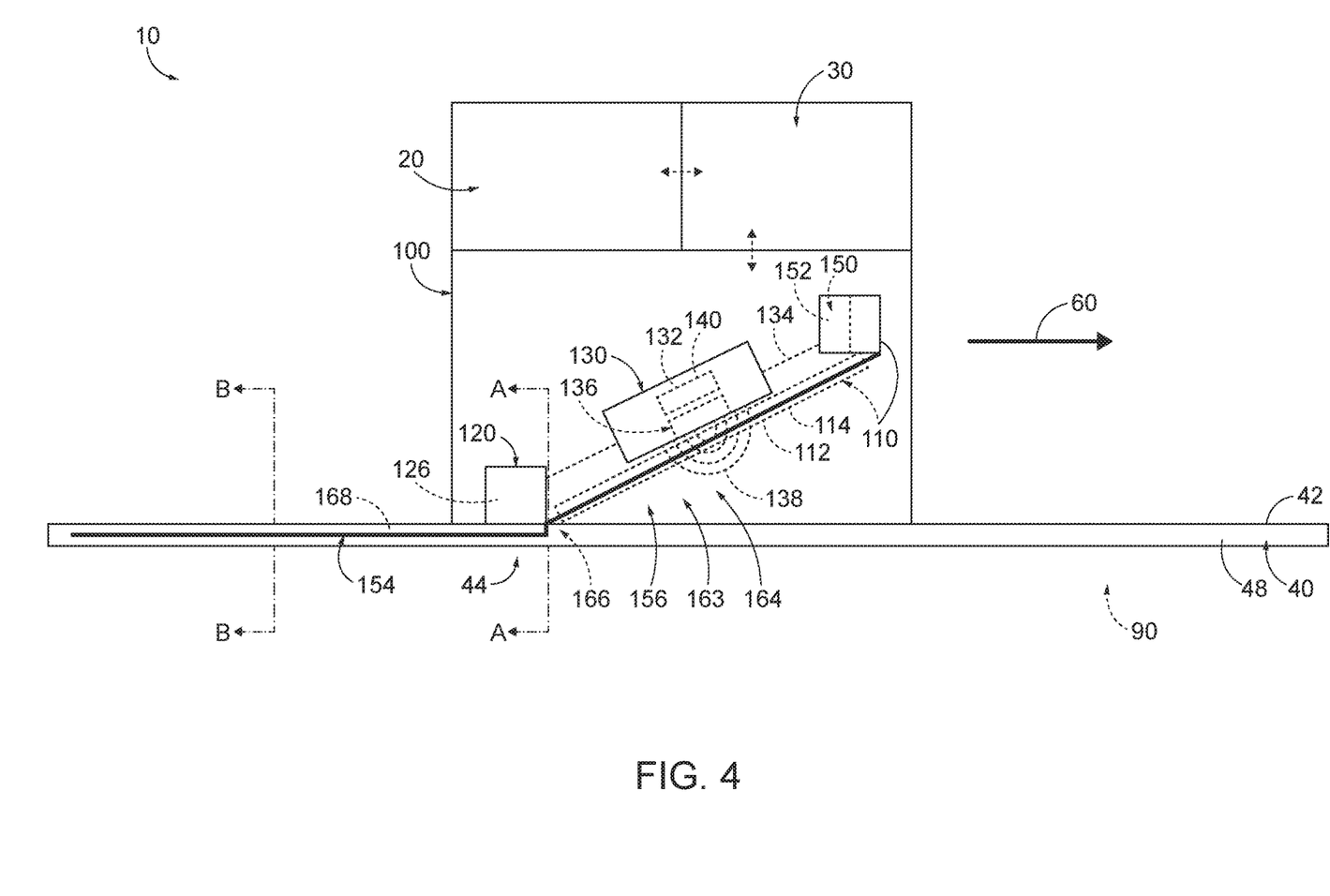
FIG. 4 is a schematic illustration of examples of a system for embedding a length of an elongate susceptor within a thermoplastic body, according to the present disclosure.
Figure 5:
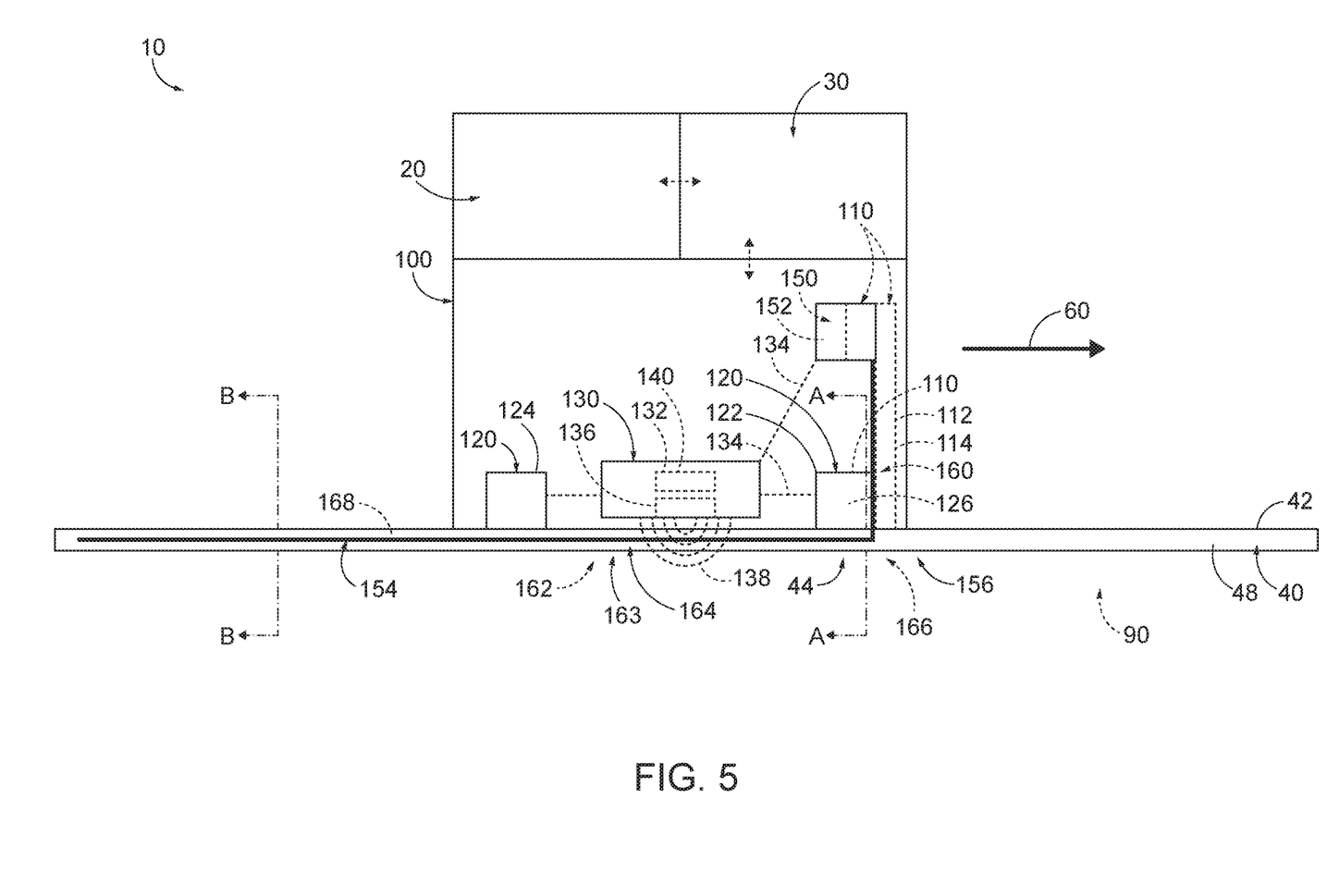
FIG. 5 is a schematic illustration of examples of a system for embedding a length of an elongate susceptor within a thermoplastic body, according to the present disclosure.

FIGS. 4-5 are schematic illustrations of examples of systems 10 for embedding a length 168 of an elongate susceptor 154 within thermoplastic body 40, according to the present disclosure. As illustrated in FIGS. 4-5, systems 10 include an application tool 100, a translation structure 20, and a controller 30. Application tool 100 includes a guide structure 110, which is configured to guide elongate susceptor 154. Application tool 100 also includes a body-contacting structure 120, which is configured to contact a body surface 42 of thermoplastic body 40. Application tool 100 further includes a heating structure 130, which is configured to heat a segment 163 of elongate susceptor 154, such as to produce and/or generate a heated portion 164 of the elongate susceptor.

Translation structure 20 is configured to operatively translate application tool 100 and thermoplastic body 40 relative to one another and/or along an embedment pathway 60 for elongate susceptor 154. Controller 30 is adapted, configured, designed, and/or programmed to control the operation of at least a portion of system 10. As examples, controller 30 may be programmed to control the operation of application tool 100 and/or of translation structure 20. This may include controlling the operation of the portion of system 10 according to and/or utilizing any suitable step and/or steps of methods 200, which are discussed in more detail herein.

Figure 8:
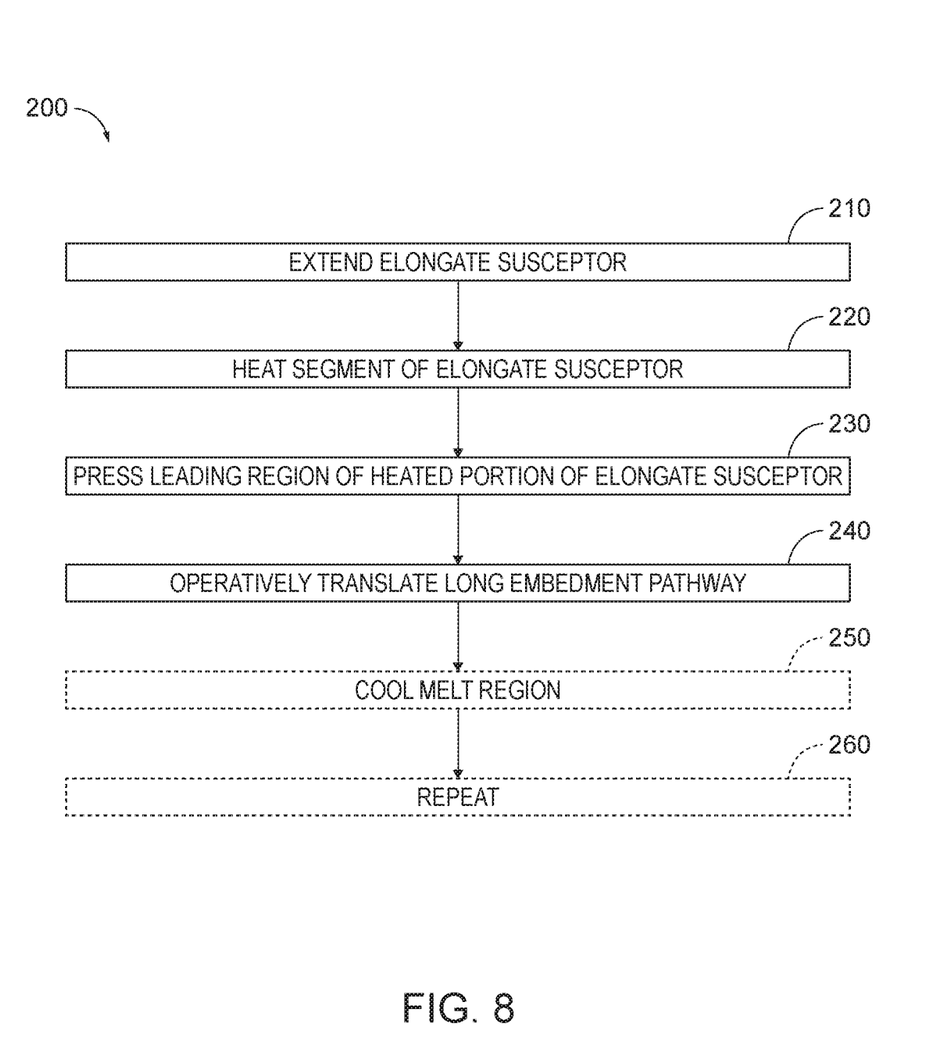
FIG. 8 is a flowchart depicting methods of embedding an elongate susceptor within a thermoplastic body, according to the present disclosure.

During operation of systems 10, and as discussed in more detail herein with reference to methods 200 of FIG. 8 and illustrated in FIGS. 4-5, elongate susceptor 154 may be extended from guide structure 110 and/or to body-contacting structure 120 such that an extended portion 156 of the elongate susceptor extends between the guide structure and the body-contacting structure. In addition, heating structure 130 may heat segment 163 of elongate susceptor 154 to produce and/or generate a heated portion 164 of the elongate susceptor. Segment 163 and heated portion 164 both may be a subset of extended portion 156. Stated another way, heating structure 130 may be configured to heat at least a subset of extended portion 156. In addition, body-contacting structure 120 may press a leading region 166 of heated portion 164 through body surface 42 of thermoplastic body 40 and into the thermoplastic body.

Heated portion 164 may be heated to a segment temperature that may be greater than a melt temperature of thermoplastic body 40. As such, contact between heated portion 164 and thermoplastic body 40 may cause thermal energy to transfer from the heated portion to the thermoplastic body, thereby melting a melt region 44 of the thermoplastic body.

Concurrently with the above, guide structure 110, body-contacting structure 120, and/or application tool 100 may be operatively translated relative to thermoplastic body 40 and/or along embedment pathway 60 for elongate susceptor 154. This process may embed length 168 of elongate susceptor 154 within thermoplastic body 40 and/or along embedment pathway 60. Stated another way, during operative translation of guide structure 110, body-contacting structure 120, and/or application tool 100 relative to thermoplastic body 40, elongate susceptor 154 may be continuously extended from guide structure 110 and/or to body-contacting structure 120 and heated by heating structure 130, thereby causing length 168 of the elongate susceptor to be embedded within thermoplastic body 40 along embedment pathway 60.

Figure 6:
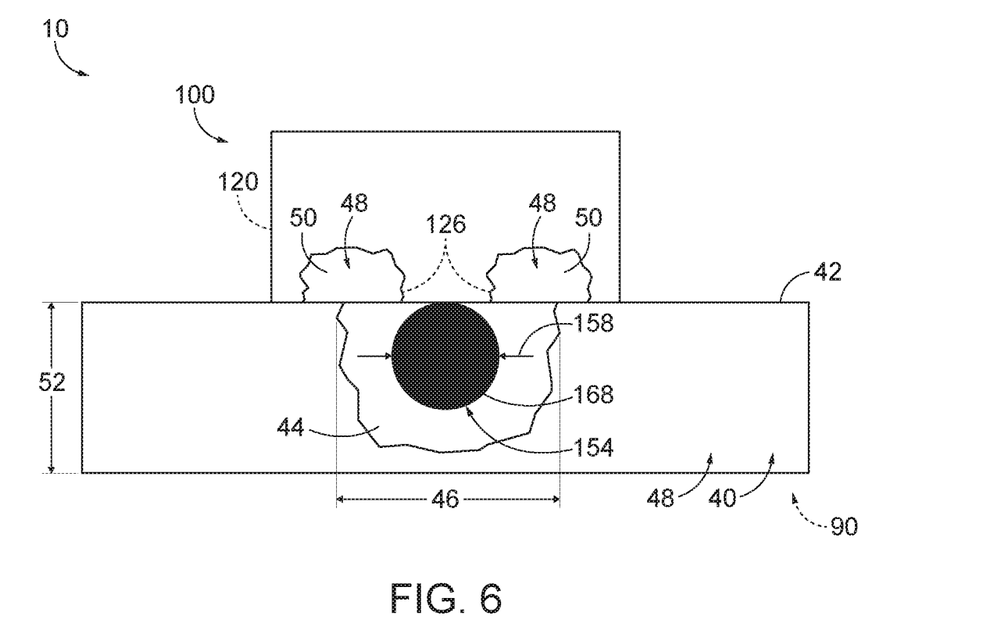
FIG. 6 is a schematic cross-sectional view taken along line A-A of FIGS. 4-5.

As illustrated in FIG. 6, which is a schematic cross-sectional view taken along line A-A of FIGS. 4-5, the act of pressing elongate susceptor 154 through body surface 42 and/or into thermoplastic body 40 may produce and/or generate a displaced volume 50 of thermoplastic material 48. Displaced volume 50 may cause unacceptable roughness of and/or undulation in body surface 42 of thermoplastic body 40. With this in mind, and as illustrated by the transition from the configuration illustrated in FIG. 6 to the configuration illustrated in FIG. 7, which is a schematic cross-sectional view taken along line B-B of FIGS. 4-5, body-contacting structure 120 may smooth body surface 42 as the body-contacting structure operatively translates across the body surface.

Returning more generally to FIGS. 4-5, guide structure 110 may include any suitable structure that may be adapted, configured, designed, and/or constructed to guide and/or direct elongate susceptor 154, such as to body-contacting structure 120 and/or along embedment pathway 60. This may include precisely directing elongate susceptor 154 toward and/or into contact with body surface 42, which may permit and/or facilitate precise placement of lengths 168 of elongate susceptor within thermoplastic body 40. Examples of guide structure 110 include a tube 112 and/or a channel 114.

Body-contacting structure 120 may include any suitable structure that may be adapted, configured, designed, and/or constructed to contact body surface 42, to press elongate susceptor 154 through body surface 42 and into thermoplastic body 40, and/or to smooth body surface 42. This may include precisely directing elongate susceptor 154 through body surface 42, which may permit and/or facilitate precise placement of lengths 168 of elongate susceptor 154 within thermoplastic body 40. Examples of body-contacting structure 120 include a body-contacting surface, a smooth surface, an arcuate surface, and/or a roller. In some examples, body-contacting surface 120 may include a groove 126, which may be configured to receive and/or to direct elongate susceptor 154. In some such examples, body-contacting structure 120 may include and/or be a grooved body-contacting surface, a grooved smooth surface, a grooved arcuate surface, and/or a grooved roller.

In some examples of application tool 100, and as illustrated in FIG. 4, body-contacting structure 120 may include and/or be a single body-contacting structure 120. The single body-contacting structure 120 may be configured to receive extended portion 156 of elongate susceptor 154 from guide structure 110, to press leading region 166 through body surface 42, and also to smooth body surface 42.

In some examples of application tool 100, and as illustrated in FIG. 5, body-contacting structure 120 may include a leading body-contacting structure 122 and a trailing body-contacting structure 124, which may be spaced-apart from the leading body-contacting structure. In some such examples, guide structure 110 may include and/or be the leading body-contacting structure.

In some such examples, guide structure 110 may be separate, distinct, and/or spaced-apart from leading body-contacting structure 122. In these examples, a leading region 160 of extended portion 156 of elongate susceptor 154 may extend between guide structure 110 and leading body-contacting structure 122, while a trailing region 162 of extended portion 156 of elongate susceptor 154 may extend between leading body-contacting structure 122 and trailing body-contacting structure 124. In these examples, leading body-contacting structure 122 may press elongate susceptor 154 through body surface 42 and/or into thermoplastic body 40 and trailing body-contacting structure 124 may smooth body surface 42.

Heating structure 130 may include any suitable structure that may be adapted, configured, designed, and/or constructed to heat segment 163 of elongate susceptor 154 and/or to produce and/or generate heated portion 164 of elongate susceptor 154. In some examples, heating structure 130 may be configured to electrically heat segment 163 of elongate susceptor 154. As an example, heating structure 130 may include an electric power source 132 configured to provide an electric current 134 to segment 163 of elongate susceptor 154, such as to resistively heat segment 163 of elongate susceptor. In some such examples, electric current 134 may flow, within elongate susceptor 154, between guide structure 110 and body-contacting structure 120, between guide structure 110 and leading body-contacting structure 122, and/or between leading body-contacting structure 122 and trailing body-contacting structure 124.

In some examples, heating structure 130 may be configured to inductively heat segment 163 of elongate susceptor 154. As an example, heating structure 130 may include an electromagnet 136 and a high-frequency alternating current power source 140. In such examples, high-frequency alternating current power source 140 may be configured to provide a high-frequency alternating current to electromagnet 136; and, responsive to receipt of the high-frequency alternating current, electromagnet 136 may produce and/or generate a high-frequency electromagnetic field 138. The high-frequency electromagnetic field may induce an electric current within segment 163 of elongate susceptor 154, thereby heating the segment of the elongate susceptor.

As illustrated in dashed lines in FIGS. 4-5, application tool 100 may include and/or may be associated with an elongate susceptor source 150. Elongate susceptor source 150, when present, may be configured to provide elongate susceptor 154 to guide structure 110. An example of elongate susceptor source 150 includes a spool 152 of elongate susceptor material.

Translation structure 20 may include any suitable structure that may be adapted, configured, designed, and/or constructed to operatively translate, to move, and/or to rotate application tool 100 and thermoplastic body 40 relative to one another. This may include operative translation, motion, and/or rotation of application tool 100 relative to thermoplastic body 40 and/or of thermoplastic body 40 relative to application tool 100. Examples of translation structure 20 include a motor, an electric motor, a stepper motor, a gear assembly, a linear actuator, a rotary actuator, a translation stage, a two-dimensional translation stage, and/or a three-dimensional translation stage.

Controller 30 may include any suitable structure that may be adapted, configured, designed, and/or programmed to control the operation of at least one other component of system 10, such as application tool 100 and/or translation structure 20. This may include control of the at least one other component of system 10 according to any suitable step and/or steps of methods 200, which are discussed in more detail herein. Examples of controller 30 include an electronic controller, a dedicated controller, a special-purpose controller, a personal computer, a special-purpose computer, a display device, a logic device, a memory device, and/or a memory device having computer-readable storage media.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct system 10 to perform any suitable portion, or subset, of methods 200. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

Thermoplastic body 40 may include any suitable structure and/or material that may receive lengths 168 of elongate susceptor 154 and/or that may be utilized in thermoplastic patch panels 90. An example of thermoplastic body 40 includes a sheet of thermoplastic material 48. Thermoplastic body 40 may include and/or may be defined by any suitable thermoplastic material 48, examples of which include a polymeric material and/or a polyetheretherketone.

Figure 7:
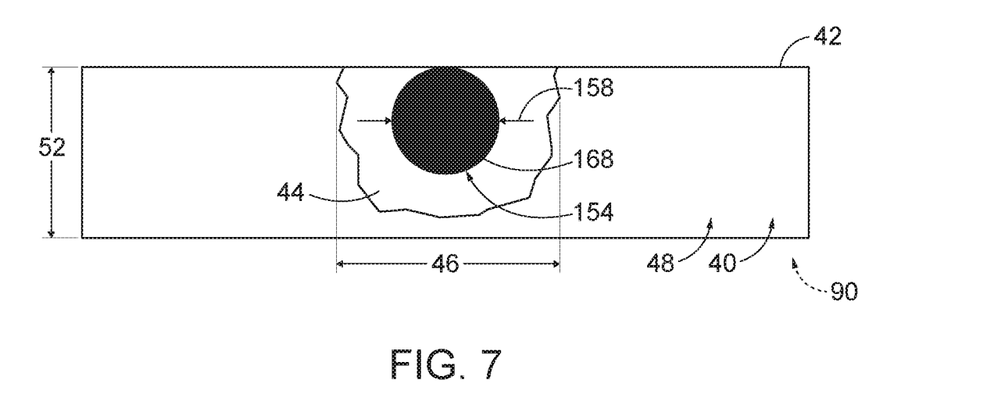
FIG. 7 is a schematic cross-sectional view taken along line B-B of FIGS. 4-5.

In some examples, thermoplastic body 40 may be relatively thin as measured in a direction that is perpendicular to body surface 42. As examples, and as illustrated in FIGS. 6-7, a thickness 52 of thermoplastic body 40 may be at least 0.01 millimeters (mm), at least 0.02 mm, at least 0.03 mm, at least 0.04 mm, at least 0.05 mm, at least 0.075 mm, at least 0.1 mm, at least 0.2 mm, at least 0.3 mm, at least 0.4 mm, at least 0.5 mm, at most 2.5 mm, at most 2 mm, at most 1.5 mm, at most 1 mm, at most 0.9 mm, at most 0.8 mm, at most 0.7 mm, at most 0.6 mm, at most 0.5 mm, at most 0.4 mm, at most 0.3 mm, at most 0.2 mm, at most 0.1 mm, and/or at most 0.05 mm.

In some examples, thickness 52 may be less than a threshold multiple of a maximum susceptor transverse cross-sectional dimension 158, such as a diameter, of elongate susceptor 154. Examples of the threshold multiple include multiples of 10 times, 8 times, 6 times, 5 times, 4 times, 3 times, 2 times, 1.5 times, or 1 time.

Elongate susceptor 154 may include any suitable structure and/or material that may be extended between guide structure 110 and body-contacting structure 120, that may be heated by heating structure 130, and/or that may be pressed through body surface 42 by body-contacting structure 120. In some examples, elongate susceptor 154 may include and/or may be defined by a susceptor material configured to absorb the high-frequency magnetic field and to generate heat therefrom. In some examples, elongate susceptor 154 may include and/or be an electrically conductive material, a metal, and/or a ferromagnetic material. In some examples, elongate susceptor 154 may include and/or be an elongate wire. In some such examples, the elongate wire may include an electrical insulator that may coat an external surface of the elongate wire. Examples of the electrical insulator include a dielectric material and/or a polymer.

FIG. 8 is a flowchart depicting methods 200 of embedding an elongate susceptor within a thermoplastic body, according to the present disclosure. Methods 200 include extending the elongate susceptor at 210 and heating a segment of the elongate susceptor at 220. Methods 200 also include pressing a leading region of a heated portion of the elongate susceptor at 230 and operatively translating along an embedment pathway at 240. Methods 200 also may include cooling a melt region at 250 and/or repeating at least a subset of the methods at 260.

Extending the elongate susceptor at 210 may include extending the elongate susceptor from a guide structure of the application tool and/or to a body-contacting structure of the application tool. This may include extending the elongate susceptor such that an extended portion of the elongate susceptor extends between the guide structure and the body-contacting structure. In some examples, the extending at 210 may include extending from an elongate susceptor source. Examples of the elongate susceptor source are disclosed herein with reference to elongate susceptor source 150 of FIGS. 4-5. Examples of the elongate susceptor are disclosed herein with reference to elongate susceptor 154 of FIGS. 4-7. Examples of the guide structure are disclosed herein with reference to guide structure 110 of FIGS. 4-5.

In some examples, and during, or at least during, the operatively translating at 240, the extending at 210 may include continuously moving the extended portion of the elongate susceptor along an elongate axis thereof. Stated another way, the continuously moving may include continuously moving the extended portion of the elongate susceptor relative to the application tool. Stated yet another way, the extending at 210 may include conveying a given region of the elongate susceptor from the guide structure and to the body-contacting structure prior to the given region of the elongate susceptor being embedded within the thermoplastic body, such as during the pressing at 230.

In some examples, the body-contacting structure may include a trailing body-contacting structure and a leading body-contacting structure that is spaced-apart from the trailing body-contacting structure. Examples of the trailing body-contacting structure and the leading body contacting structure are disclosed herein with reference to trailing body-contacting structure 124 and leading body-contacting structure 122, respectively, of FIG. 5. In some such examples, the guide structure includes the leading body-contacting structure.

In such examples, the leading body-contacting structure may be distinct and/or spaced-apart from the guide structure. In such examples, the extending at 210 may include extending a leading region of the extended portion of the elongate susceptor from the guide structure to the leading body-contacting structure. In such examples, the extending at 210 additionally or alternatively may include extending a trailing region of the extended portion of the elongate susceptor from the leading body-contacting structure to the trailing body-contacting structure. In some such examples, the pressing at 230 may include pressing with the leading body-contacting structure. In some such examples, the operatively translating at 240 may include smoothing the body surface with the trailing body-contacting structure.

The extended portion of the elongate susceptor may have and/or define an extended portion length, such as may be measured between the guide structure and the body-contacting structure, between the guide structure and the leading body-contacting structure, between the guide structure and the trailing body-contacting structure, and/or between the leading body-contacting structure and the trailing body-contacting structure. Examples of the extended portion length include lengths of at least 0.5 mm, at least 1 mm, at least 2 mm, at least 3 mm, at least 4 mm, at least 5 mm, at least 6 mm, at least 7 mm, at least 8 mm, at least 9 mm, at least 10 mm, at most 25 mm, at most 20 mm, at most 18 mm, at most 16 mm, at most 14 mm, at most 12 mm, at most 10 mm, at most 8 mm, and/or at most 6 mm. In some examples, the extended portion may have and/or define an aspect ratio, which may be defined as a ratio of the extended portion length to a characteristic transverse cross-sectional dimension, such as a diameter and/or a characteristic diameter, of the elongate susceptor. Examples of the aspect ratio include aspect ratios of at least 5, at least 10, at least 15, at least 20, at least 25, at least 30, at least 35, at least 40, at least 45, at least 50, at most 100, at most 90, at most 80, at most 70, at most 60, at most 50, at most 40, at most 30, at most 20, and/or at most 10.

The extending at 210 may be performed with any suitable timing and/or sequence during methods 200. As examples, the extending at 210 may be performed at least partially concurrently with and/or during the heating at 220, the pressing at 230, the operatively translating at 240, and/or the cooling at 250.

Heating the segment of the elongate susceptor at 220 may include heating the segment of the elongate susceptor to a segment temperature that may be greater than a melt temperature of the thermoplastic body. Additionally or alternatively, the heating at 220 may include heating the segment of the elongate susceptor to produce and/or generate a heated portion of the elongate susceptor. The heated portion of the elongate susceptor may include and/or be a subset of the extended portion of the elongate susceptor. Stated another way, the heating at 220 may include heating a region of the extended portion of the elongate susceptor.

The heating at 220 may be accomplished in any suitable manner. As an example, the heating at 220 may include heating with, via, and/or utilizing a heating structure, such as heating structure 130 of FIGS. 4-5. In some such examples, the heating structure may be spaced-apart and/or distinct from the body-contacting structure.

In some examples, and as discussed, the elongate susceptor may include an electrical insulator that coats an external surface of the elongate susceptor. In such examples, the heating at 220 may include heating without melting the electrical insulator.

The heating at 220 may be performed with any suitable timing and/or sequence during methods 200. As examples, the heating at 220 may be performed at least partially concurrently with and/or during the extending at 210, the pressing at 230, the operatively translating at 240, and/or the cooling at 250.

In some examples, the heating at 220 may include electrically heating the segment of the elongate susceptor. In some such examples, the electrically heating may include providing an electric current to the segment of the elongate susceptor, such as to resistively heat the segment of the elongate susceptor. In some such examples, the heating structure may include an electric power source, which may be configured to provide the electric current to the segment of the elongate susceptor. In some such examples, the heating at 220 may include flowing the electric current through the segment of the elongate susceptor, between the guide structure and the body-contacting structure, and/or between the leading body-contacting structure and the trailing body-contacting structure.

In some examples, the heating at 220 may include inductively heating the segment of the elongate susceptor. In some such examples, the inductively heating may include applying a high-frequency electromagnetic field to the segment of the elongate susceptor. In some such examples, the heating assembly may include an electromagnet and a high-frequency alternating current source. In some such examples, the heating at 220 may include a high-frequency electric current to the electromagnet with the high-frequency alternating current source and generating the high-frequency electromagnetic field with the electromagnet responsive to receipt of the high-frequency electric current.

In some examples, the heating at 220 may include heating the segment of the elongate susceptor from an ambient temperature and/or to the segment temperature in less than a threshold heating time. Examples of the threshold heating time include threshold heating times of at least 0.01 seconds (s), at least 0.05 s, at least 0.1 s, at least 0.2 s, at least 0.3 s, at least 0.4 s, at least 0.5 s, at least 0.6 s, at least 0.7 s, at least 0.8 s, at least 0.9 s, at least 1 s, at most 5 s, at most 4 s, at most 3 s, at most 2 s, at most 1.5 s, at most 1 s, at most 0.8 s, and/or at most 0.6 s. Such relatively rapid heating of the segment of the elongate susceptor may decrease a potential for undesired and/or unexpected heating of a remainder of the application tool and/or of the thermoplastic body, which may decrease a potential for deformation of the thermoplastic body.

Pressing the leading region of the heated portion of the elongate susceptor at 230 may include pressing the leading region through a body surface of the thermoplastic body and/or into the thermoplastic body. The pressing at 230 may include at least partially, or event completely, embedding the leading region within the thermoplastic body. Additionally or alternatively, the pressing at 230 may include at least partially, or even completely, encapsulating the leading region within the thermoplastic body.

The pressing at 230 may be accomplished in any suitable manner. As an example, the pressing at 230 may include pressing with, via, and/or utilizing the body-contacting structure and/or the leading body-contacting structure, when present.

In some examples, the pressing at 230 may include melting a melt region of the thermoplastic body, such as via heat transfer from the heated portion of the elongate susceptor and/or into the thermoplastic body. Examples of the melt region are disclosed herein with reference to melt region 44 of FIGS. 4-7. In some examples, the melt region may be relatively small and/or at least one dimension of the melt region may be comparable to a corresponding dimension of the elongate susceptor.

As an example, the melt region may have and/or define a maximum melt region transverse cross-sectional extent, which may be measured perpendicular to an elongate axis of the melt region. An example of the maximum melt region transverse cross-sectional extent is illustrated in FIGS. 6-7 and indicated at 46. Similarly, the leading region of the heated portion of the elongate susceptor may define a maximum susceptor transverse cross-sectional dimension, which may be measured perpendicular to the elongate axis of the melt region and/or of the elongate susceptor. An example of the maximum susceptor transverse cross-sectional dimension is illustrated in FIGS. 6-7 and indicated at 158. In such examples, the melting may include melting such that a ratio of the maximum melt region transverse cross-sectional extent to the maximum susceptor transverse cross-sectional extent may be at least 1.1, at least 1.25, at least 1.5, at least 1.75, at least 2, at most 5, at most 4, at most 3, at most 2.5, at most 2, and/or at most 1.5. Stated another way, the pressing at 230 may cause only localized melting of the thermoplastic body, which may decrease a potential for damage to the thermoplastic body and/or for deformation of the thermoplastic body. Additionally or alternatively, the localized melting may permit elongate susceptors to be embedded within thermoplastic bodies even when a thickness of the thermoplastic body is less than a threshold multiple of the maximum susceptor transverse cross-sectional dimension. Examples of the threshold multiple are disclosed herein.

The pressing at 230 may be performed with any suitable timing and/or sequence during methods 200. As examples, the pressing at 230 may be performed at least partially concurrently with and/or during the extending at 210, the heating at 220, the operatively translating at 240, and/or the cooling at 250.

Operatively translating along the embedment pathway at 240 may include operatively translating the guide structure, the body-contacting structure, and/or the application tool along an embedment pathway for the elongate susceptor. The embedment pathway may be defined along the body surface of the thermoplastic body and/or may define a desired location for the elongate susceptor, or for an embedded length of the elongate susceptor, within the thermoplastic body. Examples of the embedment pathway are disclosed herein with reference to embedment pathway 60 of FIGS. 4-5. The operatively translating at 240 may include operatively translating with, via, and/or utilizing a translation structure, examples of which are disclosed herein with reference to translation structure 20 of FIGS. 4-5, and may be accomplished in any suitable manner. As examples, the operatively translating at 240 may include moving the application tool relative to the thermoplastic body, and/or moving the thermoplastic body relative to the application tool.

The operatively translating at 240 additionally or alternatively may include smoothing the body surface, such as with the body-contacting structure. As an example, and as illustrated in FIG. 6 and discussed in more detail herein with reference thereto, the pressing at 230 may include displacing a displaced volume of thermoplastic material, such as displaced volume 50, such that the displaced volume of thermoplastic material extends from and/or above the body surface of the thermoplastic body. In such examples, the smoothing may include at least partially flattening the displaced volume of thermoplastic material, at least partially planarizing the body surface of the thermoplastic body, and/or pressing the displaced volume of thermoplastic material toward the body surface of the thermoplastic body, as illustrated by the configuration illustrated in FIG. 6 to the configuration illustrated in FIG. 7.

The operatively translating at 240 may be performed with any suitable timing and/or sequence during methods 200. As examples, the operatively translating at 240 may be performed at least partially concurrently with and/or during the extending at 210, the heating at 220, the pressing at 230, and/or the cooling at 250.

Cooling the melt region at 250 may include cooling the melt region to solidify the melt region and/or to retain an embedded length of the elongate susceptor within the thermoplastic body. The cooling at 250 may be accomplished in any suitable manner, such as via natural convection, forced convection, and/or conduction of thermal energy from the melt region, to an ambient environment that surrounds the thermoplastic body, and/or into the thermoplastic body.

The cooling at 250 may be performed with any suitable timing and/or sequence during methods 200. As examples, the cooling at 250 may be performed at least partially concurrently with and/or during the extending at 210, the heating at 220, the pressing at 230, and/or operatively translating at 240. Additionally or alternatively, and for a given melt region of the thermoplastic body, the cooling at 250 may be performed subsequent to the pressing at 230 and/or subsequent to the smoothing.

Repeating at least the subset of the methods at 260 may include repeating any suitable step and/or steps of methods 200 in any suitable order. As an example, the repeating at 260 may include repeating the extending at 210, the heating at 220, the pressing at 230, the operatively translating at 240, and/or the cooling at 250 a plurality of times, such as to embed a plurality of lengths of elongate susceptor in and/or within the thermoplastic material. In some such examples, the repeating at 260 also may include severing the elongate susceptor to embed a plurality of discrete, separate, and/or spaced-apart lengths of elongate susceptor in and/or within the thermoplastic material.

As discussed in more detail herein, the systems and methods according to the present disclosure may permit and/or facilitate embedding the elongate susceptor within the thermoplastic body and/or formation of thermoplastic patch panels in situations that may be challenging for conventional processes. As an example, the systems and methods disclosed herein may permit and/or facilitate precise placement and/or positioning of a plurality of lengths of elongate susceptor within a given thermoplastic body to form and/or define a thermoplastic patch panel with desired inductive heating characteristics. This may include embedding the plurality of lengths of elongate susceptor with varying spacing and/or of varying susceptor length. Additionally or alternatively, the systems and methods disclosed herein may permit and/or facilitate performing the extending at 210, the heating at 220, the pressing at 230, the operatively translating at 240, and/or the cooling at 250 without distorting and/or deforming the thermoplastic body.

Illustrative, non-exclusive examples of inventive subject matter according to the present disclosure are described in the following enumerated paragraphs:

A1. A method of embedding an elongate susceptor within a thermoplastic body, the method comprising:

extending the elongate susceptor, optionally from a guide structure of an application tool and to a body-contacting structure of the application tool such that an extended portion of the elongate susceptor extends between the guide structure and the body-contacting structure;

heating, optionally with a heating structure of the application tool, a segment of the elongate susceptor to a segment temperature that is greater than a melt temperature of the thermoplastic body to produce a heated portion of the elongate susceptor, optionally wherein the heated portion is a subset of the extended portion of the elongate susceptor;

pressing, optionally with the body-contacting structure, a leading region of the heated portion of the elongate susceptor through a body surface of the thermoplastic body and into the thermoplastic body; and concurrently with the pressing and the extending, operatively translating at least one of the guide structure, the body-contacting structure, and the application tool along an embedment pathway for the elongate susceptor, optionally wherein the embedment pathway is defined along the body surface, further optionally wherein the operatively translating includes smoothing the body surface optionally with the body-contacting structure.

A2. The method of paragraph A1, wherein the extending includes extending from an elongate susceptor source.

A3. The method of paragraph A2, wherein the elongate susceptor source includes a spool of elongate susceptor material.

A4. The method of any of paragraphs A1-A3, wherein the extending includes continuously moving, at least during the operatively translating, the extended portion of the elongate susceptor along an elongate axis thereof.

A5. The method of paragraph A4, wherein the continuously moving includes continuously moving the extended portion of the elongate susceptor relative to the application tool.

A6. The method of any of paragraphs A1-A5, wherein the guide structure includes at least one of a tube and a channel.

A7. The method of any of paragraphs A1-A6, wherein the guide structure is configured to precisely position the elongate susceptor relative to the body-contacting structure.

A8. The method of any of paragraphs A1-A7, wherein the body-contacting structure includes a trailing body-contacting structure and a leading body-contacting structure that is spaced-apart from the trailing body-contacting structure.

A9. The method of paragraph A8, wherein the guide structure includes the leading body-contacting structure.

A10. The method of any of paragraphs A8-A9, wherein the leading body-contacting structure is distinct from the guide structure, and further wherein the extending includes extending a leading region of the extended portion of the elongate susceptor from the guide structure to the leading body-contacting structure and extending a trailing region of the extended portion of the elongate susceptor from the leading body-contacting structure to the trailing body-contacting structure.

A11. The method of paragraph A10, wherein the pressing includes pressing with the leading body-contacting structure.

A12. The method of any of paragraphs A10-A11, wherein the smoothing includes smoothing with the trailing body-contacting structure.

A13. The method of any of paragraphs A1-A12, wherein the extended portion of the elongate susceptor defines an extended portion length.

A14. The method of paragraph A13, wherein the extending includes extending such that the extended portion length is at least one of:

(i) at least 0.5 millimeters (mm), at least 1 mm, at least 2 mm, at least 3 mm, at least 4 mm, at least 5 mm, at least 6 mm, at least 7 mm, at least 8 mm, at least 9 mm, or at least 10 mm; and (ii) at most 25 mm, at most 20 mm, at most 18 mm, at most 16 mm, at most 14 mm, at most 12 mm, at most 10 mm, at most 8 mm, or at most 6 mm.

A15. The method of any of paragraphs A13-A14, wherein the extending includes extending such that an aspect ratio of the extended portion is at least one of:

(i) at least 5, at least 10, at least 15, at least 20, at least 25, at least 30, at least 35, at least 40, at least 45, or at least 50; and (ii) at most 100, at most 90, at most 80, at most 70, at most 60, at most 50, at most 40, at most 30, at most 20, or at most 10.

A16. The method of any of paragraphs A1-A15, wherein the heating includes electrically heating the segment of the elongate susceptor.

A17. The method of paragraph A16, wherein the heating includes providing an electric current to the segment of the elongate susceptor to resistively heat the segment of the elongate susceptor.

A18. The method of any of paragraphs A16-A17, wherein the heating structure includes an electric power source.

A19. The method of any of paragraphs A16-A18, wherein the heating includes flowing an/the electric current, optionally through the segment of the elongate susceptor, at least one of:

(i) between the guide structure and the body-contacting structure; and (ii) between a/the leading body-contacting structure and a/the trailing body-contacting structure.

A20. The method of any of paragraphs A1-A19, wherein the heating includes inductively heating the segment of the elongate susceptor.

A21. The method of paragraph A20, wherein the heating includes applying a high-frequency electromagnetic field to the segment of the elongate susceptor.

A22. The method of any of paragraphs A20-A21, wherein the heating assembly includes an electromagnet and a high-frequency alternating current source, wherein the method includes providing a high-frequency electric current to the electromagnet with the high-frequency alternating current source, and further wherein the method includes generating a/the high-frequency electromagnetic field with the electromagnet responsive to receipt of the high-frequency electric current.

A23. The method of any of paragraphs A20-A22, wherein the heating assembly is spaced-apart from the body-contacting structure.

A24. The method of any of paragraphs A1-A23, wherein the heating includes heating the segment of the elongate susceptor from an ambient temperature to the segment temperature in less than a threshold heating time.

A25. The method of any of paragraphs A1-A24, wherein the threshold heating time is at least one of:

(i) at least 0.01 seconds (s), at least 0.05 s, at least 0.1 s, at least 0.2 s, at least 0.3 s, at least 0.4 s, at least 0.5 s, at least 0.6 s, at least 0.7 s, at least 0.8 s, at least 0.9 s, or at least 1 s; and (ii) at most 5 s, at most 4 s, at most 3 s, at most 2 s, at most 1.5 s, at most 1 s, at most 0.8 s, or at most 0.6 s.

A26. The method of any of paragraphs A1-A25, wherein the pressing includes at least partially, or even completely, embedding the leading region of the heated portion of the elongate susceptor within the thermoplastic body.

A27. The method of any of paragraphs A1-A26, wherein the pressing includes encapsulating the leading region of the heated portion of the elongate susceptor within the thermoplastic body.

A28. The method of any of paragraphs A1-A27, wherein the pressing includes melting a melt region of the thermoplastic body via heat transfer from the heated portion of the elongate susceptor.

A29. The method of paragraph A28, wherein, subsequent to the smoothing, the method further includes cooling the melt region to solidify the melt region and retain an embedded length of the elongate susceptor within the thermoplastic body.

A30. The method of any of paragraphs A28-A29, wherein the melt region defines a maximum melt region transverse cross-sectional extent as measured perpendicular to an elongate axis of the melt region, wherein the leading region of the heated portion of the elongate susceptor defines a maximum susceptor transverse cross-sectional dimension as measured perpendicular to the elongate axis of the melt region, and further wherein the melting includes melting such that a ratio of the maximum melt region transverse cross-sectional extent to the maximum susceptor transverse cross-sectional dimension is at least one of:

(i) at least 1.1, at least 1.25, at least 1.5, at least 1.75, or at least 2; and (ii) at most 5, at most 4, at most 3, at most 2.5, at most 2, or at most 1.5.

A31. The method of any of paragraphs A1-A30, wherein the operatively translating includes at least one of:

(i) moving the application tool relative to the thermoplastic body; and (ii) moving the thermoplastic body relative to the application tool.

A32. The method of any of paragraphs A1-A31, wherein the pressing includes displacing a displaced volume of thermoplastic material, which defines the thermoplastic body, such that the displaced volume of thermoplastic material extends from the body surface of the thermoplastic body.

A33. The method of paragraph A32, wherein the smoothing includes at least one of:

(i) at least partially flattening the displaced volume of thermoplastic material;

(ii) at least partially planarizing the body surface of the thermoplastic body; and (iii) pressing the displaced volume of thermoplastic material toward the body surface of the thermoplastic body.

A34. The method of any of paragraphs A1-A33, wherein the elongate susceptor includes a susceptor material configured to absorb a/the high-frequency electromagnetic field and to generate heat therefrom.

A35. The method of any of paragraphs A1-A34, wherein the elongate susceptor includes at least one of an electrically conductive material, a metal, and a ferromagnetic material.

A36. The method of any of paragraphs A1-A35, wherein the elongate susceptor includes an elongate wire.

A37. The method of any of paragraphs A1-A36, wherein the elongate susceptor includes an electrical insulator that coats an external surface of the elongate susceptor.

A38. The method of paragraph A37, wherein the method includes performing the heating without melting the electrical insulator.

A39. The method of any of paragraphs A1-A38, wherein the method includes performing at least the extending, the heating, the pressing, the operatively translating, and the smoothing without distorting the thermoplastic body.

A40. The method of any of paragraphs A1-A39, wherein the thermoplastic body is a sheet of thermoplastic material.

A41. The method of any of paragraphs A1-A40, wherein a thickness of the thermoplastic body, as measured between the body surface and an opposed body surface, is at least one of:

(i) at least 0.01 mm, at least 0.02 mm, at least 0.03 mm, at least 0.04 mm, at least 0.05 mm, at least 0.075 mm, at least 0.1 mm, at least 0.2 mm, at least 0.3 mm, at least 0.4 mm, or at least 0.5 mm; and (ii) at most 2.5 mm, at most 2 mm, at most 1.5 mm, at most 1 mm, at most 0.9 mm, at most 0.8 mm, at most 0.7 mm, at most 0.6 mm, at most 0.5 mm, at most 0.4 mm, at most 0.3 mm, at most 0.2 mm, at most 0.1 mm, or at most 0.05 mm.

A42. The method of any of paragraphs A1-A41, wherein a/the thickness of the thermoplastic body is less than a threshold multiple of a/the maximum susceptor transverse cross-sectional dimension of the elongate susceptor.

A43. The method of paragraph A42, wherein the threshold multiple is 10 times, 8 times, 6 times, 5 times, 4 times, 3 times, 2 times, 1.5 times, or 1 time.

A44. The method of any of paragraphs A1-A43, wherein the thermoplastic body is defined by at least one of a thermoplastic material, a polymeric material, and a polyetheretherketone.

A45. The method of any of paragraphs A1-A44, wherein the method further includes repeating at least the extending, the heating, the pressing, and the operatively translating a plurality of times to embed a plurality of lengths of elongate susceptor within the thermoplastic material.

B1. A system for embedding a length of an elongate susceptor within a thermoplastic body, the system comprising:

an application tool including:

(i) a guide structure configured to guide the elongate susceptor;

(ii) a body-contacting structure configured to contact a body surface of the thermoplastic body; and (iii) a heating structure configured to heat a segment of the elongate susceptor;

a translation structure configured to operatively translate the application tool and the thermoplastic body relative to one another along an embedment pathway for the elongate susceptor; and a controller programmed to control the operation of the application tool and the translation structure according to the method of any of paragraphs A1-A45.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of embedding an elongate susceptor within a thermoplastic body, the method comprising:
   extending the elongate susceptor from a guide structure of an application tool and to a body-contacting structure of the application tool such that an extended portion of the elongate susceptor extends between the guide structure and the body-contacting structure;
   heating, with a heating structure of the application tool, a segment of the elongate susceptor to a segment temperature that is greater than a melt temperature of the thermoplastic body, to produce a heated portion of the elongate susceptor;
   pressing, with the body-contacting structure, a leading region of the heated portion of the elongate susceptor through a body surface of the thermoplastic body and completely into the thermoplastic body such that the elongate susceptor is completely encapsulated within the thermoplastic body; and
   concurrently with the pressing and the extending, operatively translating at least one of the body-contacting structure and the application tool along an embedment pathway for the elongate susceptor, wherein the embedment pathway is defined along the body surface, and further wherein the operatively translating includes smoothing the body surface with the body-contacting structure.

2. The method of claim 1, wherein the extending includes extending from an elongate susceptor source that includes a spool of elongate susceptor material.

3. The method of claim 1, wherein the extending includes continuously moving, at least during the operatively translating, the extended portion of the elongate susceptor along an elongate axis thereof.

4. The method of claim 1, wherein the body-contacting structure includes a trailing body-contacting structure and a leading body-contacting structure that is spaced-apart from the trailing body-contacting structure, wherein the pressing includes pressing with the leading body-contacting structure, and further wherein the smoothing includes smoothing with the trailing body-contacting structure.

5. The method of claim 1, wherein the extended portion of the elongate susceptor defines an extended portion length of at least 0.5 millimeters and at most 25 millimeters.

6. The method of claim 1, wherein the extending includes extending such that a ratio of an extended portion length of the extended portion to a characteristic transverse cross-sectional dimension of the elongate susceptor is at least 5 and at most 100.

7. The method of claim 1, wherein the heating includes electrically heating the segment of the elongate susceptor by providing an electric current to the segment of the elongate susceptor to resistively heat the segment of the elongate susceptor.

8. The method of claim 1, wherein the heating includes inductively heating the segment of the elongate susceptor.

9. The method of claim 1, wherein the heating includes heating said segment of the elongate susceptor from an ambient temperature to the segment temperature in less than a threshold heating time of at most 3 seconds.

10. The method of claim 1, wherein the pressing includes melting a melt region of the thermoplastic body via heat transfer from the heated portion of the elongate susceptor.

11. The method of claim 10, wherein, subsequent to the smoothing, the method further includes cooling the melt region to solidify the melt region and retain an embedded length of the elongate susceptor within the thermoplastic body.

12. The method of claim 10, wherein the melt region defines a maximum melt region transverse cross-sectional extent as measured perpendicular to an elongate axis of the melt region, wherein the leading region of the heated portion of the elongate susceptor defines a maximum susceptor transverse cross-sectional dimension as measured perpendicular to the elongate axis of the melt region, and further wherein the melting includes melting such that a ratio of the maximum melt region transverse cross-sectional extent to the maximum susceptor transverse cross-sectional dimension is at most 5.

13. The method of claim 1, wherein the pressing includes displacing a displaced volume of thermoplastic material, which defines the thermoplastic body, such that the displaced volume of thermoplastic material extends from the body surface of the thermoplastic body, and further wherein the smoothing includes at least one of:
   (i) at least partially flattening the displaced volume of thermoplastic material;
   (ii) at least partially planarizing the body surface of the thermoplastic body; and
   (iii) pressing the displaced volume of thermoplastic material toward the body surface of the thermoplastic body.

14. The method of claim 1, wherein the elongate susceptor includes at least one of an electrically conductive material, a metal, and a ferromagnetic material.

15. The method of claim 1, wherein the elongate susceptor includes an elongate wire.

16. The method of claim 1, wherein the elongate susceptor includes an electrical insulator that coats an external surface of the elongate susceptor, and further wherein the method includes performing the heating without melting the electrical insulator.

17. The method of claim 1, wherein the method includes performing at least the extending, the heating, the pressing, the operatively translating, and the smoothing without distorting the thermoplastic body.

18. The method of claim 1, wherein a thickness of the thermoplastic body is less than 5 times a maximum susceptor transverse cross-sectional dimension of the elongate susceptor.

19. The method of claim 1, wherein the method further includes repeating at least the extending, the heating, the pressing, and the operatively translating a plurality of times to embed a plurality of lengths of the elongate susceptor within the thermoplastic body.

20. A method of embedding an elongate susceptor within a thermoplastic body, the method comprising:
   extending the elongate susceptor from a guide structure of an application tool and to a body-contacting structure of the application tool such that an extended portion of the elongate susceptor extends between the guide structure and the body-contacting structure;

heating, with a heating structure of the application tool, a segment of the elongate susceptor to a segment temperature that is greater than a melt temperature of the thermoplastic body, to produce a heated portion of the elongate susceptor;

pressing, with the body-contacting structure, a leading region of the heated portion of the elongate susceptor through a body surface of the thermoplastic body and completely into the thermoplastic body such that the elongate susceptor is encapsulated within the thermoplastic body; and concurrently with the pressing and the extending, operatively translating at least one of the body-contacting structure and the application tool along an embedment pathway for the elongate susceptor, wherein the embedment pathway is defined along the body surface, and further wherein the operatively translating includes smoothing the body surface with the body-contacting structure;

wherein the elongate susceptor includes an electrical insulator that coats an external surface of the elongate susceptor, and further wherein the method includes performing the heating without melting the electrical insulator.

* * * * *